United States Patent [19]
McCord et al.

[11] Patent Number: 5,106,603
[45] Date of Patent: Apr. 21, 1992

[54] METHOD FOR REMOVING SULFUR DIOXIDE FROM GAS STREAMS

[75] Inventors: Thomas H. McCord, Harvey; Jay C. Smith, Pearl River; Robin W. Strickland, New Orleans, all of La.

[73] Assignee: Freeport-McMoRan Inc., New Orleans, La.

[21] Appl. No.: 705,654

[22] Filed: May 24, 1991

[51] Int. Cl.$^5$ .............................................. C01B 17/00
[52] U.S. Cl. ........................................................ 423/242
[58] Field of Search ............ 423/242 A, 242 R, 244 R

[56] References Cited

U.S. PATENT DOCUMENTS

| | | | |
|---|---|---|---|
| 4,099,925 | 7/1978 | Yanagioka et al. | 23/285 |
| 4,156,712 | 5/1979 | Kanai et al. | 423/242 |
| 4,229,417 | 10/1980 | Kanai et al. | 422/176 |
| 4,462,969 | 7/1984 | Wilhelm | 423/242 |
| 4,540,556 | 9/1985 | Wilhelm | 423/242 |
| 4,911,901 | 3/1990 | Ogawa et al. | 423/242 |

*Primary Examiner*—Gregory A. Heller
*Attorney, Agent, or Firm*—Fisher, Christen & Sabol

[57] ABSTRACT

A process and apparatus for removing $SO_2$ from low-volume gas streams containing high concentrations of $SO_2$ includes a tank scrubber containing an aqueous $SO_2$ absorbent and an impeller. The impeller includes a vertical rotating shaft having an upper and lower impeller. The lower impeller serves to agitate the $SO_2$ absorbent. The upper impeller includes a shroud thereby directing the absorbent and gas outwardly toward the wall of the scrubber. The gas is injected into the absorbent at a point below the shrouded impeller. The shroud prevents gas bypass and thereby promotes gas-liquid mixing and, consequently, markedly improves $SO_2$ removal efficiency.

25 Claims, 1 Drawing Sheet

METHOD FOR REMOVING SULFUR DIOXIDE FROM GAS STREAMS

FIELD OF THE INVENTION

The present invention relates to a process and apparatus for scrubbing sulfur dioxide from $SO_2$-containing gas streams hereinafter referred to as flue gases or simply as gases. More specifically, it relates to a dispersed-gas phase sulfur dioxide scrubber or tank scrubber provided with an impeller means to disperse the $SO_2$-containing gas in an aqueous absorbent.

BACKGROUND OF THE INVENTION

Large amounts of sulfur dioxide are emitted annually by industrial plants worldwide and strict legislation to control these emissions is being enacted in most countries. Wet scrubbing systems, such as spray towers, are the most common means employed for removing sulfur dioxide from flue gas. The wet scrubbers typically use an aqueous solution or slurry of an alkaline reagent, such as sodium bicarbonate, sodium carbonate, lime or limestone, to remove the $SO_2$ from the flue gas. These solutions and slurries of alkaline reagents are often referred to as "$SO_2$ absorbent" or simply as "absorbent." While the conventional wet scrubbers have proved to be a fairly effective means of removing $SO_2$, they tend to have high maintenance costs due to excessive scale build-up. Additionally, $SO_2$ removal efficiency of the conventional wet scrubbers is only about 90%, which is not always adequate to enable the emitted flue gas to meet regulatory standards in many areas around the world.

Tank scrubbers offer an alternative to the conventional wet scrubbers. The tank scrubbers generally provide a vessel containing an aqueous slurry or solution of an alkaline reagent, usually either lime or limestone, to serve as the absorbent for $SO_2$. The flue gas is injected directly into the absorbent slurry. Several devices have been proposed to contact the $SO_2$-containing gas with the absorbent slurry. For example, in U.S. Pat. No. 4,099,925, the flue gas is contacted with the absorption slurry in a liquid-raising pipe. In U.S. Pat. No. 4,156,712 the flue gas is sparged into an upper portion of the liquid absorbent without the aid of any mechanical agitation above the level of flue gas injection. In U.S. Pat. No. 4,229,417, flue gas dispersion is achieved in a manner similar to that of the '712 patent except that the pipes feeding the flue gas into the absorbent slurry have notches to provide for better gas dispersion. U.S. Pat. No. 4,911,901 discloses a process wherein the flue gas is contacted with the spray of the absorbent slurry prior to gas-slurry contact in the reactor. The $SO_2$ removal efficiencies attained by these prior art tank scrubbers are in the range of 90-99% which is a considerable improvement over conventional wet scrubber efficiencies. The efficiency of these tank scrubbers is still not always adequate to meet regulatory requirements, particularly in cases where the $SO_2$ concentration in the flue gas is relatively high, and more particularly where the gas contains greater than 1% $SO_2$.

Tank scrubbers generally include a device to bubble the flue gas through the absorbent. As a result, the tank scrubbers typically are limited with respect to the volume of flue gas that can be treated.

Although the current use of tank scrubbers has been limited due to their difficulty in handling very large volumes of flue gas, there are many potential applications for the tank scrubbers in industrial plants which produce relatively small volumes, i.e., less than 25,000 CFM, of flue gas with a high $SO_2$ content. For example, newly developed metallurgical processes, such as oxygen-enriched gold ore roasting, produce such gases. Small Claus plants also produce such gases. Due to the high efficiency of the tank scrubbers when used to treat low volumes of flue gases, the number of potential applications should grow as environmental regulations become increasingly stringent. Continued improvements in tank scrubber design would provide even more opportunities for the use of the tank scrubbers.

There is therefore a continual need for improving the efficiency of tank scrubbers to remove $SO_2$ from flue gas and other gas streams. There is further a particular need for improved tank scrubbers that are able to remove large amounts of $SO_2$ from low-volume streams of flue gas containing high concentrations of $SO_2$.

The present invention is accordingly directed to a method and apparatus for providing an improved tank scrubber design for removing $SO_2$ from flue gas. The process and apparatus of the invention is able to remove $SO_2$ effectively from low-volume streams of flue gas containing high concentrations of $SO_2$.

SUMMARY OF THE INVENTION

The present invention is directed to a process and apparatus for scrubbing sulfur dioxide from $SO_2$-containing gases and particularly flue gases containing sulfur dioxide in amounts greater than 1% by volume. The $SO_2$-containing gas, which contains $SO_2$ and preferably also $O_2$, is compressed to a pressure of about 2-8 psig and injected into a tank scrubber also fed with a fresh $SO_2$ absorbent. Suitable absorbents include, for example, aqueous solutions or aqueous slurries of sodium bicarbonate, sodium carbonate, or sodium hydroxide, and aqueous slurries of lime and/or limestone, and mixtures thereof. The preferred absorbent is an aqueous slurry of lime. The tank scrubber includes an agitating means to disperse the gases in the absorbent, to circulate the aqueous absorbent and to maintain solids in suspension. The agitation system of the tank scrubber includes an upper impeller means designed to provide high shear and a lower impeller means designed to provide agitation. The upper and lower impellers are preferably mounted on a single rotating impeller shaft positioned in the tank such that the impellers are below the surface of the absorbent. In another embodiment, the impellers may be mounted on separate rotating shafts. In a preferred embodiment, the lower impeller is a pitched blade. Preferably, the upper impeller is a shrouded flat-blade disk design including a circular disk, which serves as a shroud, and a plurality of radially extending flat blades or vanes terminating at the outer edge of the disk. The flat blades are fixed to the underside of the disk. The shroud of the upper impeller is preferably located between one and three feet below the surface of the absorbent solution or slurry. The $SO_2$-containing gas is injected into the solution or slurry of $SO_2$ absorbent and dispersed in said solution or slurry by the upper impeller. The pH of the aqueous absorbent is preferably maintained at about pH 4.5 to pH 7.0 by the addition of fresh absorbent. The solution or slurry temperature preferably is maintained at 33°–185° F. The $SO_2$-containing gas is injected at a point near the impeller shaft between the upper and lower impellers at 3 to 5 feet below the surface of the absorbent solution or slurry held in the tank scrubber. A single nozzle gas injection means is preferably used to inject the $SO_2$-containing gas in a downward direction. Alternatively, a multiple injection nozzle may be used.

The $SO_2$ contained in the gas dissolved in the aqueous phase of the absorbent and reacts with the absorbent to form intermediate products, such as sodium bisulfite $NaHSO_3$, sodium sulfite $Na_2SO_3$, calcium bisulfite $Ca(HSO_3)_2$, and/or calcium sulfite $CaSO_3$. If sufficient oxygen is available, the corresponding sulfates are formed. If insufficient oxygen is available in the injected gas to complete the reaction to $Na_2SO_4$ or $CaSO_4$, additional oxygen may be added either into the gas inlet line, directly into the tank scrubber solution or slurry or directly into the solution or slurry effluent line from the tank scrubbers.

In one preferred embodiment of the invention, the process is carried out as a continuous process. The fresh aqueous absorbent is continuously introduced to the tank scrubber whereby the absorbent in the tank comprises a mixture of fresh absorbent and spent absorbent. The fresh absorbent is introduced to the tank at a rate complementing the injection of the $SO_2$-containing gas whereby the pH of the aqueous absorbent is preferably maintained between about pH 4.5 and pH 7.0 and more preferably between about pH 5.4 to 6.0.

The spent $SO_2$ absorbent is withdrawn from the agitated tank at a rate sufficient to maintain a constant solution or slurry level at about 1 to 3 feet above the top of the shrouded impeller.

BRIEF DESCRIPTION OF THE DRAWINGS

The description of the invention is to be considered in combination with the drawings of which the following is a brief description.

DETAILED DESCRIPTION OF THE INVENTION

Figure 1:
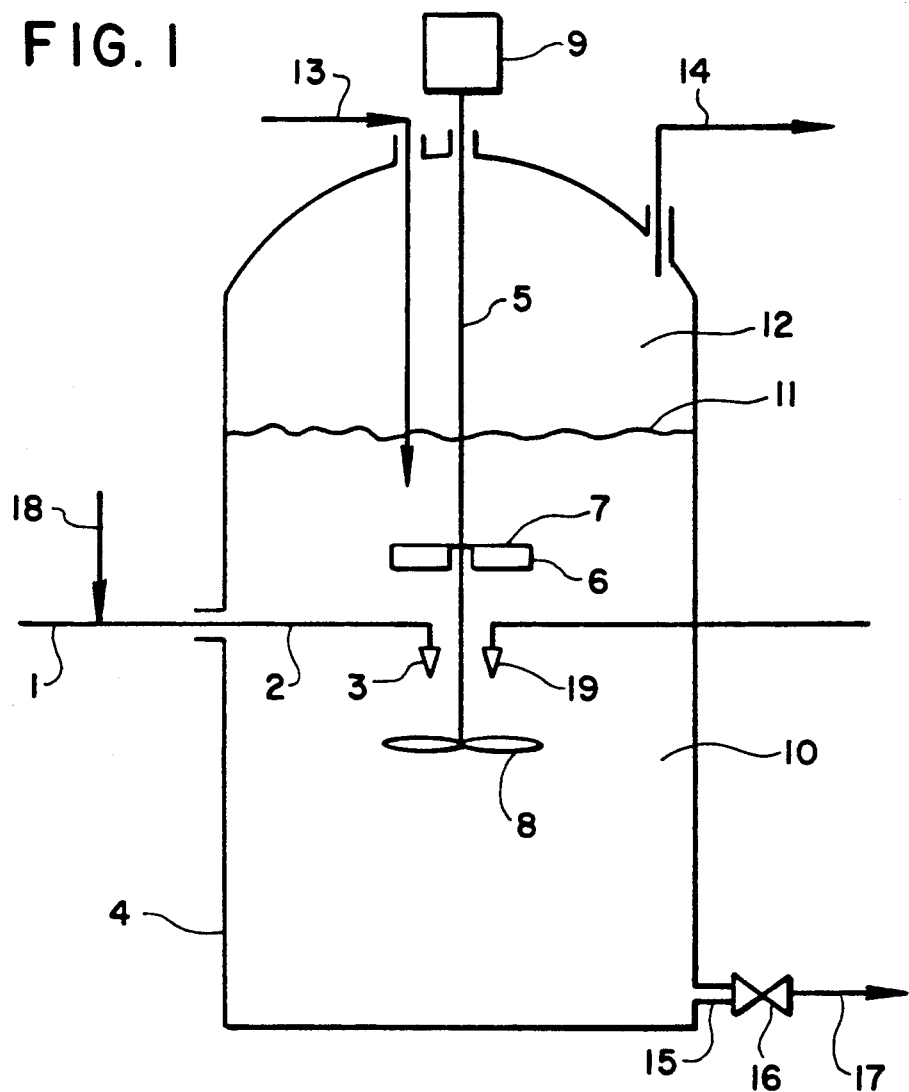
FIG. 1 is schematic diagram of the apparatus for carrying out the process in a preferred embodiment of the invention.

The disadvantages and limitations of the previous tank scrubbers are obviated by the process and apparatus of the present invention. The invention is directed to a process of removing sulfur dioxide from gases and particularly flue gases using a novel tank scrubber. The process of the invention is able to effectively remove large amounts of sulfur dioxide from gases containing from 1% to as much as 50% by volume sulfur dioxide.

An $SO_2$-containing gas, such as flue gas, is injected into a tank scrubber containing an $SO_2$ absorbent. The tank scrubber includes an impeller means comprising an upper shrouded high shear impeller. The impeller means further includes a lower pitched blade serving to agitate the aqueous absorbent. The upper and lower impellers are preferably mounted on a common vertical rotating shaft having an upper and lower zone for mounting said impellers. The impellers may also be mounted on separate shafts. The $SO_2$-containing gas is injected into the aqueous absorbent at a point between the upper and lower impellers preferably about 3 to 5 feet below the level of the aqueous absorbent. The upper impeller provides shearing action to disperse the injected gas and to accelerate the absorption of $SO_2$ into the absorbent. The shroud on the upper impeller substantially prevents the $SO_2$-containing gas from bubbling out of the absorbent before being dispersed in the absorbent. The blades of the lower impeller provide agitating action and may be pitched so as to lift the absorbent along the shaft or, alternatively, to propel the absorbent toward the bottom of the tank.

In the preferred embodiments of the invention the $SO_2$ absorbent is an aqueous solution or slurry of an alkaline absorbent material. The preferred alkaline absorbent material is calcium carbonate such as limestone, calcium oxide such as lime and calcium hydroxide such as slaked lime. Other satisfactory alkaline absorbent materials may include, for example, sodium bicarbonate, sodium carbonate, sodium hydroxide.

The process of the invention is preferably a continuous process such that fresh aqueous absorbent is continuously added to the reaction vessel and spent absorbent is continuously removed. Although less preferred, the process may be carried out in a batch process. The $SO_2$-containing gas is injected into the absorbent as described in greater detail hereinafter. Throughout the $SO_2$-containing gas injection and addition of fresh absorbent, the pH of the aqueous absorbent in the tank scrubber is preferably maintained between about 4.5 and 7.0 and more preferably about 5.4 to 6.0. Under certain operating conditions, the pH of the absorbent may be allowed to rise above 7.0. The pH of the aqueous absorbent is preferably controlled by coordinating the rate of the fresh absorbent addition with the rate of the gas injection such that the pH is maintained at the desired level. The amount and rate of the addition of fresh absorbent is dependent on the concentration of the absorbent and the sulfur dioxide content of the gas being treated.

The apparatus according to a preferred embodiment of the invention is shown in FIG. 1. Tank scrubber 4 is a closed-top vessel equipped with an agitation system consisting of an upper shrouded impeller 6 to provide high shear and a lower pitched-blade impeller 8 to provide agitation. Preferably, the shrouded impeller 6 is provided with four or six flat rectangular blades 20 for gas dispersion. The tips of the blades as shown in FIG. 1 are aligned with the outer edge of the impeller shroud 7. The size of the impeller will vary with the size of the tank and other factors. For example, a 20 foot diameter tank will typically require about a 6 to 7 foot diameter upper impeller and about a 9 to 10 foot diameter lower impeller to achieve maximum efficiency. The shroud 7 prevents by-passing of the injected gas along the impeller shaft 5 and allows for the injection of gas at relatively shallow depths in the aqueous absorbent without hindering the flue gas retention time in the absorbent. Shallow gas injection reduces the horsepower requirements for gas injection. The upper and lower impellers 6 and 8 are preferably attached to a common impeller shaft 5 driven by a motor 9.

The tank scrubber solution or slurry 10, hereinafter also referred to as the "tank scrubber fluid" or simply as the "fluid", maintained in tank scrubber 4 comprises an aqueous mixture of fresh and spent $SO_2$ absorbent. The tank scrubber fluid 10 is maintained at a pH above 4.5 and preferably above 5.4 by the addition of fresh absorbent. When an aqueous slurry of lime is used as the fresh absorbent, the tank scrubber fluid 10 is preferably maintained at a pH range of 4.5-7.0 and more preferably at a pH range of 5.4-6.0. Additional fresh $SO_2$ absorbent is continually added via line 13 to adjust the pH of the tank scrubber fluid 10. The pH of the tank scrubber fluid may be allowed to rise above 7.0, however, at pH values above 7.0, the reaction occurring between Ca(OH)$_2$ and the carbon dioxide contained in the flue gas causes increased CaCO$_3$ formation and might result in an increased tendency to scale and in higher lime consumption. At pH values below 4.5, the SO$_2$ solubility becomes so low that scrubber efficiency is detrimentally affected. The tank scrubber fluid surface level 11 is preferably maintained at about 1 to 3 feet above the top of the shrouded impeller 6. The scrubber fluid surface level 11 is controlled by continual or periodic withdrawal of slurry contained in the tank scrubber 4. Tank scrubber 4 is dimensioned to provide a gas collection space 12 above the absorbent fluid to collect the treated gases prior to leaving the scrubber 4 via line 14.

Referring to FIG. 1, flue gas which contains SO$_2$ and preferably also O$_2$, and which has been compressed to about 2-8 psig, enters tank scrubber 4 via lines 1 and 2 and injection nozzle 3. As shown in FIG. 1 the flue gas injection nozzle 3 preferably injects the flue gas downwardly in the direction toward the lower impeller 8. The flue gas is injected beneath the surface of tank scrubber fluid 10 at a point near the agitator shaft 5 directly beneath the upper shrouded impeller 6. This flue gas injection point is preferably about 3 to 5 feet below the tank scrubber fluid surface level 11. Preferably, a single injection nozzle 3 is used to avoid potential scale buildup that commonly results from the use of multiple injection points. The interior of the injection nozzle 3 may be kept clean by the action of multiple water sprays (not shown) directed against the interior nozzle lip and inner nozzle pipe surface.

The SO$_2$ in the flue gas reacts with the absorbent contained in the tank scrubber fluid 10 to form the intermediate reaction products such as sodium bisulfite NaHSO$_3$, sodium sulfite Na$_2$SO$_3$, calcium bisulfite Ca(HSO$_3$)$_2$ and/or calcium sulfite CaSO$_3$. These intermediate products further react with oxygen to form the corresponding sulfates when sufficient oxygen is present in the scrubber. If there is insufficient O$_2$, i.e. less than about 5% O$_2$ by volume, available in the flue gas to efficiently complete the oxidation of the intermediate product, an O$_2$ source may be added. In the preferred embodiments of the invention the flue gas contains at least about 5% by volume oxygen at the time it is injected into the absorbent. This additional O$_2$ source can be added to the flue gas inlet line 1 by means of line 18. The additional O$_2$ source could also be added directly to the tank scrubber fluid 10 through a distribution system such as for example nozzle 19 which could be located below the surface 11 of the tank scrubber fluid 10 adjacent the flue gas injection nozzle 3 and below the upper impeller 6. In another mode, the effluent tank scrubber fluid 10 exiting tank scrubber 4 by lines 15 and 17 and valve 16 may be treated with air or oxygen by means external to tank scrubber 4 (not shown). The oxygen added to the flue gas to supplement the oxygen content of the gas is generally in the form of an oxygen-containing gas, such as air, although a more pure or concentrated form of oxygen may be used.

The tank scrubber 4 is sized to provide a fluid retention time of at least 30 minutes, and preferably between 8 and 24 hours. The tank scrubber fluid 10, which is maintained at 33°-185° F., is withdrawn from tank scrubber 4 via line 15, control valve 16 and line 17. If a sodium bicarbonate or sodium carbonate solution is used as the absorbent, the resulting sodium sulfate solution can be regenerated using lime as known in the art. If lime is used as the absorbent as in the preferred embodiment, the tank scrubber fluid 10 can be sent to a tailings pond for disposal or, alternatively, the fluid can be dewatered and its solids content recovered for use in industrial products.

A unique advantageous feature of the present tank scrubber 4 is the agitation system. The upper shroud 7, by preventing the short circuiting of gas up the agitator shaft 5, allows for relatively shallow injection of the flue gas and still facilitates excellent gas-fluid contact in a minimal volume of adsorbent. This minimizes flue gas compression needs, i.e. about 2 to 8 psig, and saves considerably on power requirements. The shroud 7 in combination with the two impeller means provides intense agitation and mixing of gases and tank scrubber fluid 10 and, consequently, promotes the rapid and efficient absorption of SO$_2$ by the tank scrubber fluid 10.

Figure 2:
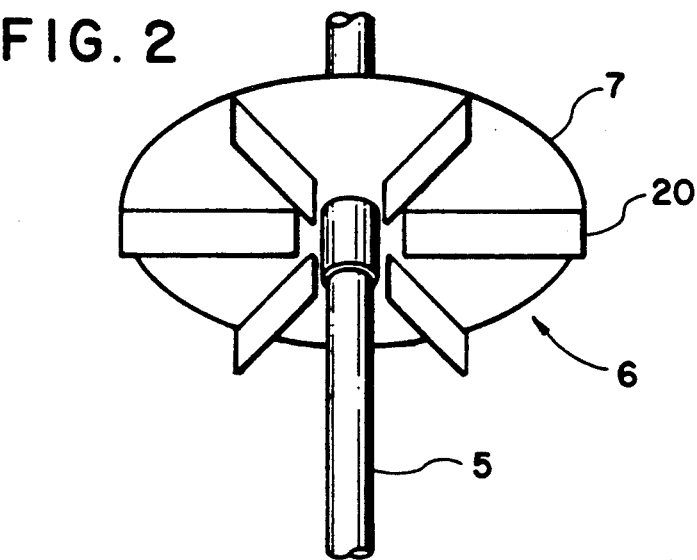
FIG. 2 is a bottom perspective view of the shrouded impeller according to a preferred form of the invention.

FIG. 2 is a bottom perspective view of the shrouded impeller 6 and the shroud 7. In this embodiment, the impeller has six flat rectangular blades 20 mounted directly beneath the shroud 7. As shown, the shroud 7 is a substantially flat disk-like member fixed to the impeller shaft 5. The blades 20 are substantially of a rectangular shape fixed to the bottom side of the shroud 7. The blades 20 are preferably positioned in a vertical plane substantially parallel with the axis of the impeller shaft 5. In the embodiment shown in FIG. 2 the impeller blades extend radially outward from the impeller shaft 5 and terminate at the peripheral edge of the shroud 7. Preferably the blades 20 are spaced slightly from the shaft 5. Alternatively the blades 20 may contact the shaft 5 and extend radially outward to the peripheral edge of the shroud 7. In a further embodiment the impeller blades 20 may be pitched with respect to the axis of the impeller shaft 5.

The shroud 7 and the impeller blades 20 are preferably dimensioned to prevent the injected flue gas from passing upwardly along the impeller shaft and prematurely exiting the scrubber. The shaft 5 is rotated at a speed sufficient to direct the flue gases radially outward and to disperse the flue gases in the absorbent and promote sufficient retention time to effectively remove the sulfur dioxide.

The principal advantage of the present invention is the efficiency of SO$_2$ removal from the flue gas. Prior art tank scrubbers provide a range of SO$_2$ removal efficiency of 90-99% and, more typically, provide about 93-96% SO$_2$ removal efficiency for flue gases containing comparatively low levels of sulfur dioxide. In contrast, the apparatus and process of the present invention provide an SO$_2$ removal efficiency in the order of 99.9%, based on full scale plant operational data, which is one order of magnitude better than the highest previously obtained. The process and apparatus of the invention has been shown to be effective in removing sulfur dioxide from flue gases containing high levels of sulfur dioxide as well as other contaminants.

Other advantages include simplicity of design. For example, the flue gas is injected into the tank scrubber fluid 10 via a single injection nozzle 3 while prior art processes typically utilize multiple injection pipes. Based on experience derived from full scale plant operation, the simplicity of design translates into low maintenance costs and ease of operation. The ability of the present device to use a single injection nozzle rather than a plurality of nozzles is due to the efficiency of the shrouded impeller to effectively disperse the flue gas in the absorbent.

It is another distinct advantage of the present invention that a mechanical method of creating the gas dispersion is provided. The process of the invention utilizes a shrouded impeller 6 to create a fine dispersion of the gas in the tank scrubber fluid 10 and thereby facilitates efficient removal of $SO_2$ from the flue gas.

It is still another advantage of the invention that scale formation on tank equipment is largely eliminated in systems using calcium compounds such as lime as the $SO_2$ absorbent. In the present embodiment of the invention, this is achieved because calcium sulfite crystals tend to grow preferentially on the finely dispersed solids produced by the innovative techniques employed. Other advantages of the invention will become obvious to those skilled in the art.

In one preferred embodiment a single tank is used. A second holding tank or scrubber tank may be used in conjunction with the first tank to increase the retention time thereby allowing growth to occur properly.

The present system is particularly suitable to handle the discharge gas from a gold ore, oxygen-enriched roasting operation such as that described in U.S. Pat. No. 4,919,715. About 2600 SCFM of flue gas with an $SO_2$ content of 4–14% and an $O_2$ content of about 15–17% are emitted from the gold ore roasting operation. Operating efficiencies for the tank scrubber unit during full-scale roasting plant operations have exceeded 99.9%. The novel tank scrubber of the invention is ideally suited for other oxygen-enriched, gold ore roasting plants and, also, for similar-sized plants in other industries, particularly those which emit relatively small volumes of high $SO_2$-content flue gas, for example, Claus plants. The presence of substantial quantities of $O_2$ in the flue gas is also beneficial although, as previously discussed, an oxygen-providing gas can be injected separately, as required.

EXAMPLE

A 2660 SCFM stream of flue gas from a gold ore oxygen roasting plant containing 4% $SO_2$ and 17% $O_2$ was fed into a tank scrubber as shown in FIG. 1. The temperature and pressure of the flue gas stream was 160° F. and 3.8 psig, respectively. The tank scrubber was 20 ft in diameter by 22 ft high. The tank scrubber was equipped with a shrouded impeller, having a shroud 82 inches in diameter and six blades each 38 inches long by 12.2 inches high, welded to the shroud so that the outer tips of the blades are aligned with the outer edge of the shroud. Mounted on the same shaft below the shrouded impeller was a pitch blade impeller 112 inches in diameter. The relative position of the impellers was about 144 inches and 37 inches from the bottom of the tank, respectively. The impellers were equipped with a 75 hp. motor and were operated at about 37 RPM. The tank contained a 20% by weight calcium sulfate slurry, the pH of which was maintained in the range of 5.4 to 6.0 by the continuous addition of a lime slurry. The slurry level in the tank scrubber was controlled at about 15 ft. The excess slurry was continuously withdrawn from the tank scrubber to maintain the slurry at a constant level. The gas stream exiting the scrubber contained about 20 ppm $SO_2$, equivalent to an $SO_2$ removal efficiency of about 99.95%.

What is claimed is:

1. A process for removing $SO_2$ from an $SO_2$-containing gas comprising:

a. adding an aqueous $SO_2$ absorbent into a vessel in an amount to maintain an $SO_2$ absorbent fluid at a pH of at least 4.5;

b. agitating said aqueous $SO_2$ absorbent fluid utilizing a rotating impeller comprising an upper impeller and a lower impeller, wherein the upper impeller includes at least one shroud to inhibit the bypassing of gas;

c. injecting $SO_2$-containing gas below the surface of said aqueous absorbent fluid to a proximity between the said upper and lower impellers;

d. maintaining the level of the aqueous absorbent fluid in said vessel at a predetermined height by withdrawing aqueous absorbent fluid; and e. removing desulfurized gas from said vessel.

2. The process of claim 1 wherein the $SO_2$ absorbent fluid is an aqueous solution or slurry of an alkaline component selected from the group consisting of sodium bicarbonate, sodium carbonate, sodium hydroxide, slaked lime, limestone and mixtures thereof.

3. The process of claim 1 wherein the $SO_2$ content of the gas entering the vessel is about 1% to about 50% by volume.

4. The process of claim 1 wherein the gas entering the vessel contains oxygen and wherein its oxygen content is at least about 5% by volume.

5. The process of claim 1 comprising adding oxygen to said gas prior to injecting into said absorbent fluid to provide a total $O_2$ content in the gas of at least about 5% by volume.

6. The process of claim 1 comprising adding an oxygen-containing source to said absorbent fluid in an amount sufficient to oxidize substantially all sulfite and bisulfite products in the aqueous absorbent fluid to a sulfate.

7. The process of claim 1 comprising injecting oxygen into the aqueous absorbent fluid withdrawn from said vessel in step (d) to oxidize substantially all sulfite and bisulfite products to a sulfate.

8. The process of claim 1 comprising compressing said gas to about 2–8 psig prior to injecting into the aqueous absorbent fluid.

9. The process of claim 1 wherein the temperature of the fluid is maintained at about 33°–185° F.

10. The process of claim 1 wherein the $SO_2$ absorbent fluid is a slurry of lime.

11. The process of claim 1 wherein the pH of the aqueous absorbent fluid in said vessel is maintained at about 5.4–6.0.

12. The process of claim 1 comprising retaining the aqueous absorbent fluid in the vessel for at least 30 minutes.

13. The process of claim 1 comprising retaining the aqueous absorbent fluid in the vessel for about 8–24 hours.

14. The process of claim 1 comprising maintaining the level of the aqueous absorbent fluid at about 1 to 3 feet above the top of the upper impeller.

15. The process of claim 1 comprising injecting the gas at about 3–5 feet below the surface of the absorbent fluid.

16. The process of claim 1 comprising injecting the gas into the aqueous absorbent fluid through a single nozzle.

17. The process of claim 1 wherein said upper and lower impeller are mounted on a common rotating shaft.

18. The process of claim 1 wherein said upper and lower impeller are each mounted on a separate rotating shafts.

19. The process of claim 1 comprising rotating said upper impeller at a speed to produce sufficient shear to disperse said $SO_2$-containing gas.

20. The process of claim 1 wherein said lower impeller comprises a pitched blade impeller to agitate said aqueous absorbent.

21. The process of claim 20 wherein said upper impeller comprises a substantially horizontal circular disk fixed to a substantially vertical rotating shaft and a plurality of radially extending vanes disposed on a lower side of said disk and extending from said shaft to a peripheral edge of said disk.

22. The process of claim 21 comprising injecting an oxygen-containing gas in proximity to said shaft between said upper and lower impeller.

23. A continuous process for removing $SO_2$ from $SO_2$-containing gas comprising the steps of:
 a. continuously introducing an $SO_2$-containing gas into a vessel containing an aqueous $SO_2$ absorbent, wherein said aqueous absorbent within said vessel has a pH of at least 4.5, said vessel including an agitator means comprising a rotating substantially vertical shaft having an upper and lower zone, said lower zone having a pitched blade first impeller means to agitate said aqueous $SO_2$ absorbent, said upper zone of the shaft including a second impeller means disposed above said first impeller means and having a substantially horizontal shroud fixed to said shaft and means to direct said aqueous absorbent substantially radially outward from the shaft;
 b. injecting said $SO_2$-containing gas into said aqueous absorbent at a point disposed between said upper and lower impeller means and simultaneously agitating said aqueous absorbent by rotating said impeller shaft at a speed to produce sufficient shear whereby injected flue gas is directed radially outward to disperse said gas in said aqueous absorbent whereby absorption of $SO_2$ from said gas is effected; and
 c. removing said injected gas from the aqueous absorbent.

24. The process of claim 23 comprising continuously introducing an aqueous absorbent to said vessel at a rate whereby said aqueous absorbent in the vessel has pH of at least 4.5.

25. The process of claim 23 comprising continuously removing spent aqueous absorbent from said vessel whereby the absorbent is maintained at a substantially constant level.

* * * * *